United States Patent
Ando et al.

(10) Patent No.: US 9,190,689 B2
(45) Date of Patent: Nov. 17, 2015

(54) SOLID OXIDE FUEL CELL

(71) Applicant: TOTO LTD., Kitakyushu (JP)

(72) Inventors: Shigeru Ando, Odawara (JP); Seiki Furuya, Fujisawa (JP); Yutaka Momiyama, Yokohama (JP); Kiyoshi Hayama, Fujisawa (JP); Osamu Okamoto, Chigasaki (JP); Naoki Watanabe, Chigasaki (JP); Nobuo Isaka, Yokohama (JP); Masaki Sato, Fujisawa (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 173 days.

(21) Appl. No.: 14/026,401

(22) Filed: Sep. 13, 2013

(65) Prior Publication Data

US 2014/0093809 A1 Apr. 3, 2014

(30) Foreign Application Priority Data

Sep. 28, 2012 (JP) ................. 2012-217396
Aug. 29, 2013 (JP) ................. 2013-178376

(51) Int. Cl.
*H01M 8/10* (2006.01)
*H01M 8/12* (2006.01)
(Continued)

(52) U.S. Cl.
CPC ............ *H01M 8/1286* (2013.01); *H01M 8/004* (2013.01); *H01M 8/0236* (2013.01); *H01M 8/0245* (2013.01); *H01M 8/1226* (2013.01);
(Continued)

(58) Field of Classification Search
CPC H01M 2008/1293; H01M 8/10; H01M 8/023
See application file for complete search history.

(56) References Cited

U.S. PATENT DOCUMENTS 6,844,098 B1  1/2005  Ishihara et al.
7,033,690 B1  4/2006  Akikusa et al.
(Continued)

FOREIGN PATENT DOCUMENTS

JP   11-335164 A    12/1999
JP   2002-015756 A  1/2002
(Continued)

OTHER PUBLICATIONS

Tavangarian et al. (Ceramics—Silikáty 54 (2) 122-127 (2010)).*
(Continued)

*Primary Examiner* — Stewart Fraser
*Assistant Examiner* — Olatunji Godo
(74) *Attorney, Agent, or Firm* — Brinks Gilson & Lione; G. Peter Nichols

(57) ABSTRACT

An object of the present invention is to provide a fuel cell preventing formation of a diffusion layer containing Ca and other elements, and having an excellent power generation performance at low temperature by preventing breakdown of a crystal structure of an electrolyte by firing. Disclosed is a solid oxide fuel cell which includes an inner electrode, a solid electrolyte, and an outer electrode, each being sequentially laminated on the surface of a porous support. The porous support contains forsterite, and has a Mg/Si molar ratio of 1.90 to 2.2 both inclusive, and an A-to-B ratio (A/B) of 0.0% to 9.0% both inclusive, where A denotes a maximum peak height which appears at a diffraction angle $2\theta=26.5°$ to $27.0°$ and B denotes a maximum peak height which appears at $36.5°$ to $37.0°$ in a powder X-ray diffraction pattern obtained by using Cu-K$\alpha$ radiation.

4 Claims, 8 Drawing Sheets

(51) Int. Cl.
  *H01M 8/00*   (2006.01)
  *H01M 8/02*   (2006.01)
  *H01M 8/24*   (2006.01)

(52) U.S. Cl.
  CPC ............ *H01M 8/243* (2013.01); *H01M 8/0206* (2013.01); *H01M 8/0297* (2013.01); *H01M 2008/1293* (2013.01); *Y02E 60/521* (2013.01); *Y02E 60/525* (2013.01)

(56) References Cited

U.S. PATENT DOCUMENTS

2004/0121217 A1* 6/2004 Herman et al. .................. 429/38
2005/0031518 A1* 2/2005 Munakata et al. ............ 423/263

FOREIGN PATENT DOCUMENTS

JP          2005-093241 A    4/2005
WO     WO 2013/026647 A1    2/2013

OTHER PUBLICATIONS

Guo et al. (Applied Surface Science 252 (2006) 7911-7916).*
Extended European Search Report for European Application No. 13184600.8, dated Jan. 27, 2014, 5 pages.
Extended European Search Report for European Application No. 13184607.3, dated Jan. 27, 2014, 4 pages.

* cited by examiner

SOLID OXIDE FUEL CELL

RELATED APPLICATIONS

This application claims priority under 35 U.S.C. §119 to Japanese Patent Application Nos. 2012-217396 filed on Sep. 28, 2012 and 2013-178376 filed on Aug. 29, 2013, the entire content of which are hereby incorporated by reference.

TECHNICAL FIELD

The present invention relates to a solid oxide fuel cell.

BACKGROUND ART

In recent years, intense studies have been conducted on low operating-temperature solid oxide fuel cells to reduce operating temperatures of solid oxide fuel cells to around 600° C. to 800° C. As a solid electrolyte material for low operating-temperature solid oxide fuel cells, lanthanum-gallate-based oxide have been proposed (see, for example, Japanese Patent Application Publication No. 2002-15756 (pages 1 to 9, FIGS. 1 to 9), and Japanese Patent Application Publication No. Hei 11-335164 (pages 1 to 12, FIGS. 1 to 12)). In solid oxide fuel cells in which lanthanum-gallate-based oxide is used as a solid electrolyte material, NiO-YSZ having similar thermal expansion properties is employed as a support material. Nevertheless, NiO-YSZ is expensive, and hence an inexpensive support material is desired. In this regard, the use of relatively inexpensive forsterite-based sintered compact as a support material has been proposed (see Japanese Patent Application Publication No. 2005-93241).

CITATION LIST

Patent Literature

[Patent Literature 1] Japanese Patent Application Publication No. 2002-15756
[Patent Literature 2] Japanese Patent Application Publication No. Hei 11-335164
[Patent Literature 3] Japanese Patent Application Publication No. 2005-93241

SUMMARY OF THE INVENTION

Technical Problems

However, the followings have been found out. Specifically, when forsterite is used as a porous support material to prepare a solid oxide fuel cell in which an inner electrode, a solid electrolyte, and an outer electrode are sequentially laminated on the surface of the porous support, the laminated electrolyte does not become dense, depending on a Mg/Si molar ratio of the porous support; as a result, a desired power generation performance is not demonstrated, or the power generation performance is decreased over time. In addition, as the amount of oxides derived from impurities is increased, the composition of the electrolyte is changed, and the electrolyte is made less dense; as a result, a desired power generation performance is not demonstrated, or the power generation performance is decreased over time.

Solution to Problems

The present inventors who have discovered the aforementioned phenomena have found that the phenomena can be suppressed when the Mg/Si ratio of a porous support and the amount of oxides derived from impurities are within predetermined range. The present invention has been made based on these findings. Specifically, the present invention relates to a solid oxide fuel cell including an inner electrode, a solid electrolyte, and an outer electrode, each of which is sequentially laminated on a surface of a porous support. The porous support contains forsterite, and the porous support has a Mg/Si molar ratio of 1.90 to 2.2, and an A-to-B ratio (A/B) of 0.0% to 9.0% both inclusive, where A denotes a maximum peak height which appears at a diffraction angle $2\theta=26.5°$ to $27.0°$ and B denotes a maximum peak height which appears at $36.5°$ to $37.0°$ in a powder X-ray diffraction pattern obtained by using Cu-K$\alpha$ radiation. If Mg/Si<1.90, a component of the solid electrolyte reacts with a Si component (derived from free silica) of the porous support during co-firing, so that the solid electrolyte is degraded. Hence, the initial power generation performance and the long-term stability of the power generation performance are both decreased. On the other hand, if Mg/Si>2.2, a large amount of MgO monophase exists, and the thermal contraction coefficient of the porous support is lowered. Accordingly, the solid electrolyte also contracts less during co-firing, so that the solid electrolyte does not become dense, and the power generation performance is decreased. Meanwhile, if an A-to-B ratio exceeds 9.0%, oxides derived from impurities reacts with the solid electrolyte during co-firing, so that the solid electrolyte is degraded. Thus, by making the Mg/Si ratio and the A-to-B ratio of the porous support within the predetermined range, a chemical change in the fuel cell can be prevented under a high temperature environment. This makes it possible to provide a fuel cell having excellent power generation performance and durability. Note that the peak which appears at the diffraction angle $2\theta=26.5°$ to $27.0°$ is a peak resulting from impurities, while the peak which appears at the diffraction angle $2\theta=36.5°$ to $37.0°$ is a peak resulting from forsterite that is the main component. Thus, the A-to-B ratio represents the amount of oxides derived from impurities. Regarding a sample powder subjected to the powder X-ray diffraction, a raw-material powder of the porous support may be directly used in the measurement, or the porous support of the fuel cell may be comminuted to form a powder for the measurement.

In the present invention, the solid electrolyte preferably contains lanthanum-gallate-based oxide, and the solid electrolyte more preferably contains lanthanum-gallate-based oxide doped with Sr and Mg. When the Mg/Si ratio is within the above-described range, the diffusion of Sr and Mg is suppressed during co-firing with the solid electrolyte, so that the crystal structure of the lanthanum-gallate-based oxide can be maintained; in addition, a dense solid electrolyte layer can be formed. Hence, the power generation performance and the long-term stability are excellent.

Moreover, the solid electrolyte is preferably represented by the general formula $La_{1-a}Sr_aGa_{1-b-c}Mg_bCo_cO_3$, where $0.05 \leq a \leq 0.3$, $0 < b < 0.3$, and $0 \leq c \leq 0.15$. This enables a high power generation performance at low temperature. Since the operation is possible at low temperature, the stability of the porous support is further increased.

In the present invention, the porous support may be a laminate having at least two layers. Reducing the amount of a calcium element on the surface of the porous support can prevent the diffusion of the dopant of the lanthanum-gallate-based oxide during firing (in the process of producing the cell). If it is possible to prevent the diffusion of the dopant, the crystal structure of the electrolyte can be maintained, so that the power generation performance is stable for a long period.

Advantageous Effects of the Invention

Since a chemical change in a fuel cell can be prevented under a high temperature environment according to the present invention, it is possible to provide a fuel cell having excellent power generation performance and durability.

DETAILED DESCRIPTION OF THE PREFERRED EMBODIMENTS

Figure 1:
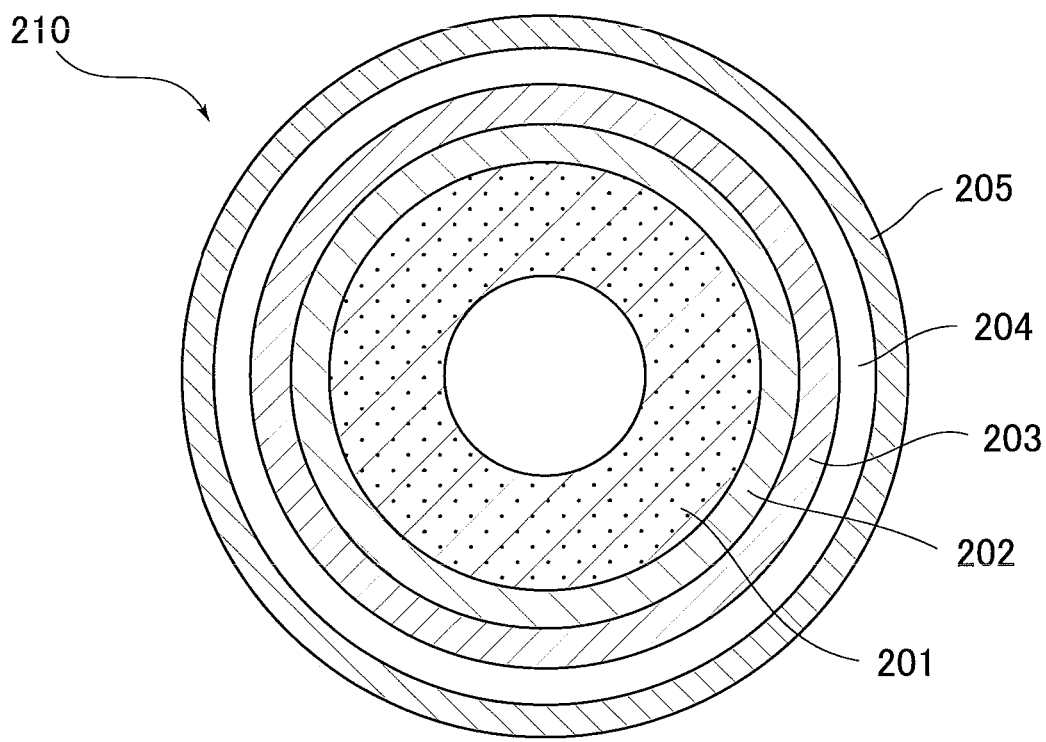
FIG. 1 is a schematic view showing one aspect of a cross section of a solid oxide fuel cell of the present invention.

A solid oxide fuel cell of the present invention includes an inner electrode, a solid electrolyte, and an outer electrode, each of which is sequentially laminated on the surface of a porous support. The fuel cell of the present invention is not limited to have particular shapes. The fuel cell may have for example a cylindrical shape, a planar shape, a hollow planar shape in which multiple gas flow paths are formed, or other similar shapes. Since the porous support of the fuel cell of the present invention is an insulating support, horizontal stripe type dells are preferable in which multiple power generating elements are formed in series on one porous support. Here, the power generating elements mean a laminate having an inner electrode (fuel electrode or air electrode), a solid electrolyte, and an outer electrode (air electrode or fuel electrode), each of which is sequentially laminated.

In the fuel cell of the present invention, the porous support contains forsterite, and the porous support has a Mg/Si molar ratio of 1.90 to 2.2 both inclusive, preferably 1.93 to 2.13 both inclusive, and an A-to-B ratio of 0.0% to 9.0% both inclusive, preferably 0.0% to 7.0% both inclusive, where A denotes a maximum peak height which appears at a diffraction angle $2\theta=26.5°$ to $27.0°$ and B denotes a maximum peak height which appears at $36.5°$ to $37.0°$ in a powder X-ray diffraction pattern obtained by using Cu-K$\alpha$ radiation. The porous support is a sintered compact containing forsterite ($Mg_2SiO_4$) crystals, crystalline and/or amorphous MgO, crystalline and/or amorphous $SiO_2$, and other glassy materials and impurities. When the Mg/Si ratio and the A-to-B ratio of the porous support are within the predetermined range, a chemical change in the fuel cell can be prevented under a high temperature environment.

In the fuel cell of the present invention, the porous support preferably contains a Mg element and a Si element in total of 90 mass %, preferably 95 mass %, more preferably 98 mass % or more, in terms of MgO and $SiO_2$. In the fuel cell of the present invention, it is more preferable that the porous support has a sum of peak intensities of first diffraction lines (i.e., diffraction lines having the highest intensity) of the crystal components other than forsterite crystal of 5 or less, wherein the peak intensity of a first diffraction line of the forsterite crystal obtained by X-ray diffraction is 100.

Preferably, the porous support is consisting essentially of forsterite (i.e., mainly formed from forsterite). The porous support may have a calcium element (Ca) content of 0.2 mass % or less in terms of CaO in a surface region on at the power generating elements side. Herein, the "surface region" means a region that covers a depth of approximately 100 µm from the surface. The Ca content in such a surface region can be measured, for example, by XRF. The XRF measurement sample is prepared as follows. Specifically, the laminated surface of the fuel cell is mechanically striped, and the surface of the exposed porous support is mechanically ground up to the depth of approximately 100 µm to obtain the sample of XRF. Moreover, when the sample is quantified by XRF, JCRM R 901 talc powder which is a certified reference material by the Ceramic Society of Japan is used to create a one point calibration curve for the XRF.

The Ca concentration distribution in the porous support may be uniform, or may have a gradation toward the surface of the porous support at the power generating elements side. Alternatively, the porous support may be a laminate having two or more layers, each having different Ca contents. When the porous support has a gradation of Ca concentration distribution toward the surface of the porous support at the power generating elements side, or when the porous support is a laminate having two or layers, the Ca content in regions other than the surface region at the power generating elements side may exceed 0.2 mass % in terms of CaO. The porous support is obtained by preparing a compact having a Ca content within a predetermined range, and then firing the compact. The porous support is preferably obtained by preparing a compact by mixing a raw material containing Ca element, the concentration of which is higher than the above-described range, and forsterite with a raw material containing Ca element, the concentration of which is lower than the above-described range, and forsterite so that the compact can have a Ca element content within the predetermined range, and then firing the compact.

In the fuel cell of the present invention, the inner electrode may be a fuel electrode or an air electrode. In the fuel cell (cylindrical cell, hollow planar cell, or the like) including the gas flow paths within the porous support, the inner electrode is preferably a fuel electrode. When the inner electrode is a fuel electrode, the outer electrode is an air electrode.

The fuel electrode may be made of NiO/zirconium-containing oxide, NiO/cerium-containing oxide, or the like. Here, the NiO/zirconium-containing oxide means one obtained by uniformly mixing NiO with a zirconium-containing oxide in a predetermined ratio. The NiO/cerium-containing oxide means one obtained by uniformly mixing NiO with a cerium-containing oxide in a predetermined ratio. The zirconium-containing oxide in the NiO/zirconium-containing oxide includes zirconium-containing oxides doped with one or more of CaO, $Y_2O_3$, and $Sc_2O_3$, and the like. The cerium-containing oxide in the NiO/cerium-containing oxide includes ones represented by the general formula $Ce_{1-y}Ln_yO_2$, where Ln is any one of or a combination of two or more of La, Pr, Nd, Sm, Eu, Gd, Tb, Dy, Ho, Er, Tm, Yb, Lu, Sc, and Y, $0.05 \leq y \leq 0.50$. Note that since NiO is reduced under a fuel atmosphere and turned into Ni, the mixture becomes Ni/zirconium-containing oxide or Ni/cerium-containing oxide. The fuel electrode may be composed of a single layer or multiple layers. In the case where the fuel electrode as the inner electrode includes multiple layers, Ni/YSZ (yttria-stabilized zirconia) is used for a layer at the porous support side while Ni/GDC ($Gd_2O_3$—$CeO_2$) (=fuel electrode catalyst layer) is used for a layer at the electrolyte side.

The air electrode may be made of a lanthanum-cobalt-based oxide such as $La_{1-x}Sr_xCoO_3$ (where x=0.1 to 0.3) or $LaCo_{1-x}Ni_xO_3$ (where x=0.1 to 0.6), a lanthanum-ferrite-based oxide ($La_{1-m}Sr_mCo_{1-n}Fe_nO_3$ (where 0.05<m<0.50, 0<n<1)) which is a solid solution of (La, Sr)$FeO_3$ and (La, Sr)$CoO_3$, or the like. The air electrode may be composed of a single layer or multiple layers. In the case where the air electrode as the outer electrode includes multiple layers, $La_{0.6}Sr_{0.4}Co_{0.2}Fe_{0.8}O_3$ (=air electrode catalyst layer) is used for a layer at the electrolyte side while $La_{0.6}Sr_{0.4}Co_{0.8}Fe_{0.2}O_3$ (=air electrode) is used for the outermost layer.

In the fuel cell of the present invention, the solid electrolyte may be made of lanthanum-gallate-based oxide, stabilized zirconia doped with one or more of Y, Ca, and Sc, or the like. The solid electrolyte includes preferably lanthanum-gallate-based oxide doped with Sr and Mg, more preferably lanthanum-gallate-based oxide (LSGM) represented by the general formula $La_{1-a}Sr_aGa_{1-b-c}Mg_bCo_cO_3$, where $0.05 \leq a \leq 0.3$, $0<b<0.3$, and $0 \leq c \leq 0.15$. A layer of the solid electrolyte may be provided at the fuelelectrode side as a reaction prevention layer that includes ceria doped with La ($Ce_{1-x}La_xO_2$ (where 0.3<x<0.5)). The reaction prevention layer is preferably made of $Ce_{0.6}La_{0.4}O_2$. The solid electrolyte may be composed of a single layer or multiple layers. In the case where the solid electrolyte includes multiple layers, a reaction prevention layer such as $Ce_{0.6}La_{0.4}O_2$ is used between the fuel electrode and a layer of the solid electrolyte made of LSGM.

FIG. 1 is a schematic view showing one aspect of a cross section of the solid oxide fuel cell of the present invention, and shows a type in which the inner electrode is a fuel electrode. A solid oxide fuel cell 210 of the present invention includes, for example, a porous support 201, a (first/second) fuel electrode 202, a (first/second) solid electrolyte 203, a (first/second) air electrode 204, and a current collecting layer 205. In the solid oxide fuel cell of the present invention, the thickness of each layer is preferably: 0.5 to 2 mm for the porous support, 10 to 200 µm for the fuel electrode, 0 to 30 µm for the fuel electrode catalyst layer, 0 to 20 µm for the reaction prevention layer, 5 to 60 µm for the solid electrolyte, 0 to 30 µm for the air electrode catalyst layer, and 10 to 200 µm for the air electrode. Here, (first/second) means "being a single layer or two layers, and in the case of two layers, having a first layer and a second layer."

A method for producing the solid oxide fuel cell of the present invention is not particularly limited. The solid oxide fuel cell of the present invention can be produced, for example, as follows.

A solvent (such as water or alcohol) is added to a raw-material powder containing forsterite to prepare a green body. In this event, an optional component such as a dispersant, a binder, an anti-foaming agent, or a pore-forming agent may be added. The green body thus prepared is molded, dried, and then pre-fired (800° C. or higher but lower than 1100° C.) to obtain a porous support. For molding the green body, a sheet molding method, a press molding method, an extrusion method, or the like is employed. In the case of a porous support in which gas flow paths are formed, an extrusion method is preferable. When the porous support forming multiple layers is molded, in addition to a method of "multilayer extrusion" in which the multiple layers are integrally extruded, a method in which the upper layer is formed by coating or printing can also be employed. The coating method include a slurry coating method in which a raw material slurry is applied, a tape casting method, a doctor blade casting method, a transferring method, and the like. The printing method includes a screen printing method, an inkjet method, and the like.

The inner electrode, the solid electrolyte, and the outer electrode can be obtained as follows. Specifically, to each raw-material powder, a solvent (such as water or alcohol) and a molding additive such as a dispersant or a binder are added to prepare a slurry. The slurry is applied, dried, and then fired (1100° C. or higher but lower than 1400° C.). The slurry can be applied by the same method that can be employed for the coating with the upper layer of the porous support including multiple layers. The firing may be performed every time each layer of the electrodes and solid electrolyte is formed, but "co-firing" in which the multiple layers are fired at once is preferably performed. In addition, in order not to degrade the electrolyte by the diffusion of the dopant or the like, the firing is preferably performed in an oxidizing atmosphere. More preferably, a gas mixture of air+oxygen is used, and the firing is performed in such an atmosphere that the oxygen concentration is 20 mass % to 30 mass % both inclusive. When a fuel electrode is used as the inner electrode and an air electrode is used as the outer electrode, it is preferable that the fuel electrode and the electrolyte be co-fired, and then the air electrode be formed and fired at a temperature lower than the co-firing.

Figure 2:
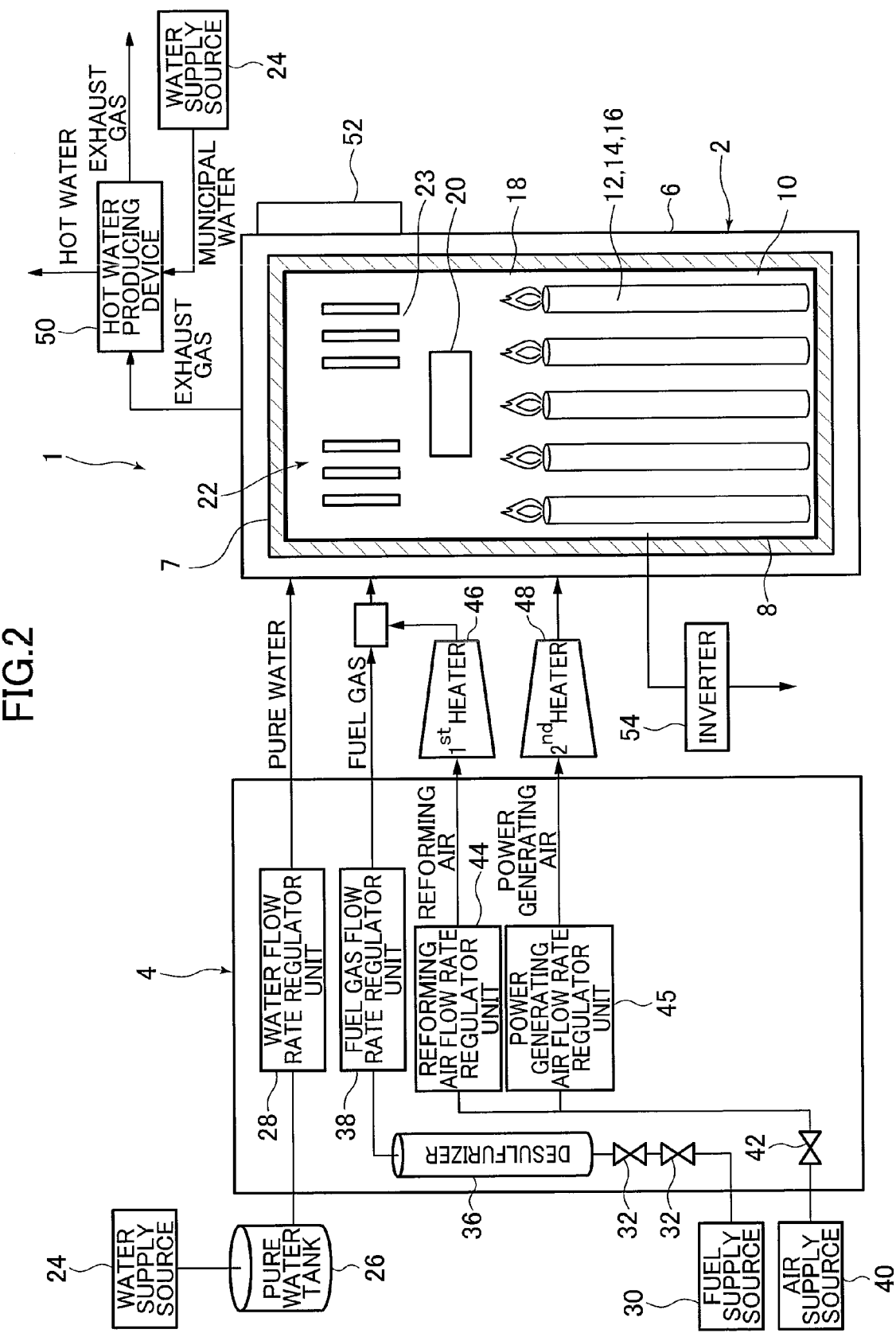
FIG. 2 is an overview diagram showing a solid oxide fuel cell system.

A solid oxide fuel cell system using the solid oxide fuel cell of the present invention is not limited to have particular structures. The production thereof, other materials, and the like may be publicly-known ones. FIG. 2 is an overview diagram showing a solid oxide fuel cell system according to one embodiment of the present invention. As shown in FIG. 2, a solid oxide fuel cell system 1 includes a fuel cell module 2 and an auxiliary unit 4.

The fuel cell module 2 includes a housing 6. The housing 6 with an insulating material 7 has a sealed space 8 therein. Note that it is acceptable not to provide the insulating material. A fuel cell assembly 12 for carrying out the power generating reaction using fuel gas and oxidizer (air) is disposed in a power generating chamber 10, which is the lower part of this sealed space 8. This fuel cell assembly 12 is furnished with ten fuel cell stacks 14 (see FIG. 4); the fuel cell stack 14 includes 16 fuel cell units 16 (see FIG. 5). Thus, the fuel cell assembly 12 has 160 fuel cell units 16, all of which are serially connected.

In the sealed space 8 of the fuel cell module 2, a combustion chamber 18 is formed above the aforementioned power generating chamber 10. In the combustion chamber 18, residual fuel gas and residual oxidizer (air) not used in the power generating reaction are combusted to produce exhaust gas. Above the combustion chamber 18, a reformer 20 for reforming fuel gas is disposed. The reformer 20 is heated by the heat of combustion of the residual gas to a temperature at which reforming reaction can take place. Above the reformer 20, an air heat exchanger 22 is disposed, which receives the heat of the reformer 20 to heat air and which reduces a decrease in the temperature of the reformer 20.

Next, the auxiliary unit 4 includes a pure water tank 26 for holding water from a water supply source 24 such as water-works and filtering the water into pure water, and a water flow rate regulator unit 28 for regulating the flow rate of water supplied from the reservoir tank. The auxiliary unit 4 further includes a gas shutoff valve 32 for shutting off fuel gas such as municipal gas supplied from a fuel supply source 30, a desulfurizer 36 for desulfurizing the fuel gas, and a fuel gas flow rate regulator unit 38 for regulating the flow rate of the fuel gas. Furthermore, the auxiliary unit 4 includes an electromagnetic valve 42 for shutting off air as an oxidant supplied from an air supply source 40, a reforming air flow rate regulator unit 44 and a power generating air flow rate regulator unit 45 for regulating the flow rate of air, a first heater 46 for heating reforming air supplied to the reformer 20, and a second heater 48 for heating power generating air supplied to the power generating chamber. The first and second heaters 46 and 48 are provided to efficiently raise temperature at startup, but may be omitted.

Next, the fuel cell module 2 is connected to a hot-water producing device 50. The hot-water producing device 50 is supplied with exhaust gas. The hot-water producing device 50 is supplied with municipal water from the water supply source 24. This municipal water is turned into hot water by the heat of the exhaust gas and supplied to a hot water reservoir tank in an unillustrated external water heater. Moreover, the fuel cell module 2 is provided with a control box 52 for controlling the supply flow rate of the fuel gas and the like. Further, the fuel cell module 2 is connected to an inverter 54. The inverter 54 serves as an electrical power extraction unit (electrical power conversion unit) for supplying electrical power generated by the fuel cell module to the outside.

Figure 3:
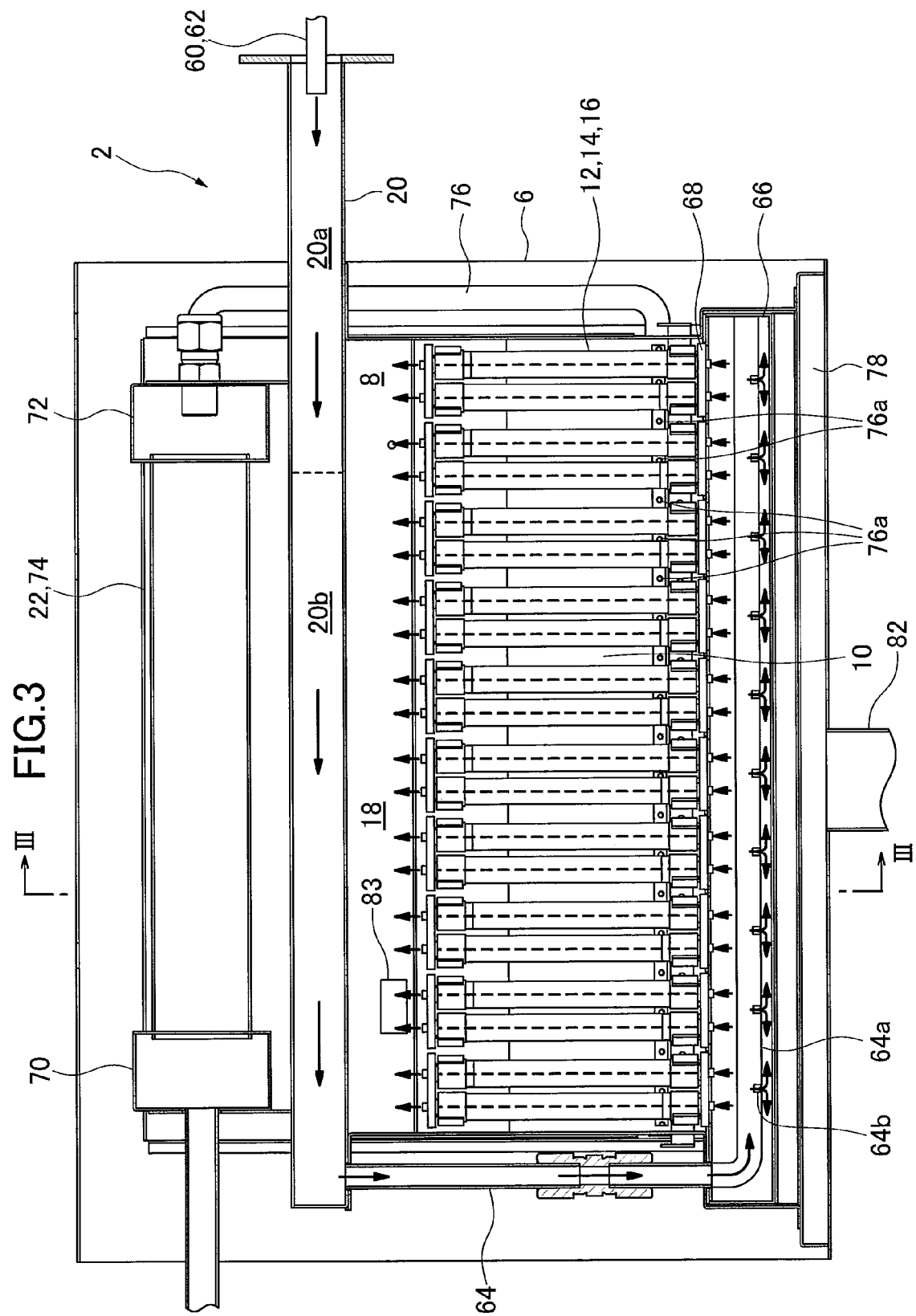
FIG. 3 is a side elevation cross section showing a fuel cell module in the solid oxide fuel cell system.
Figure 6:
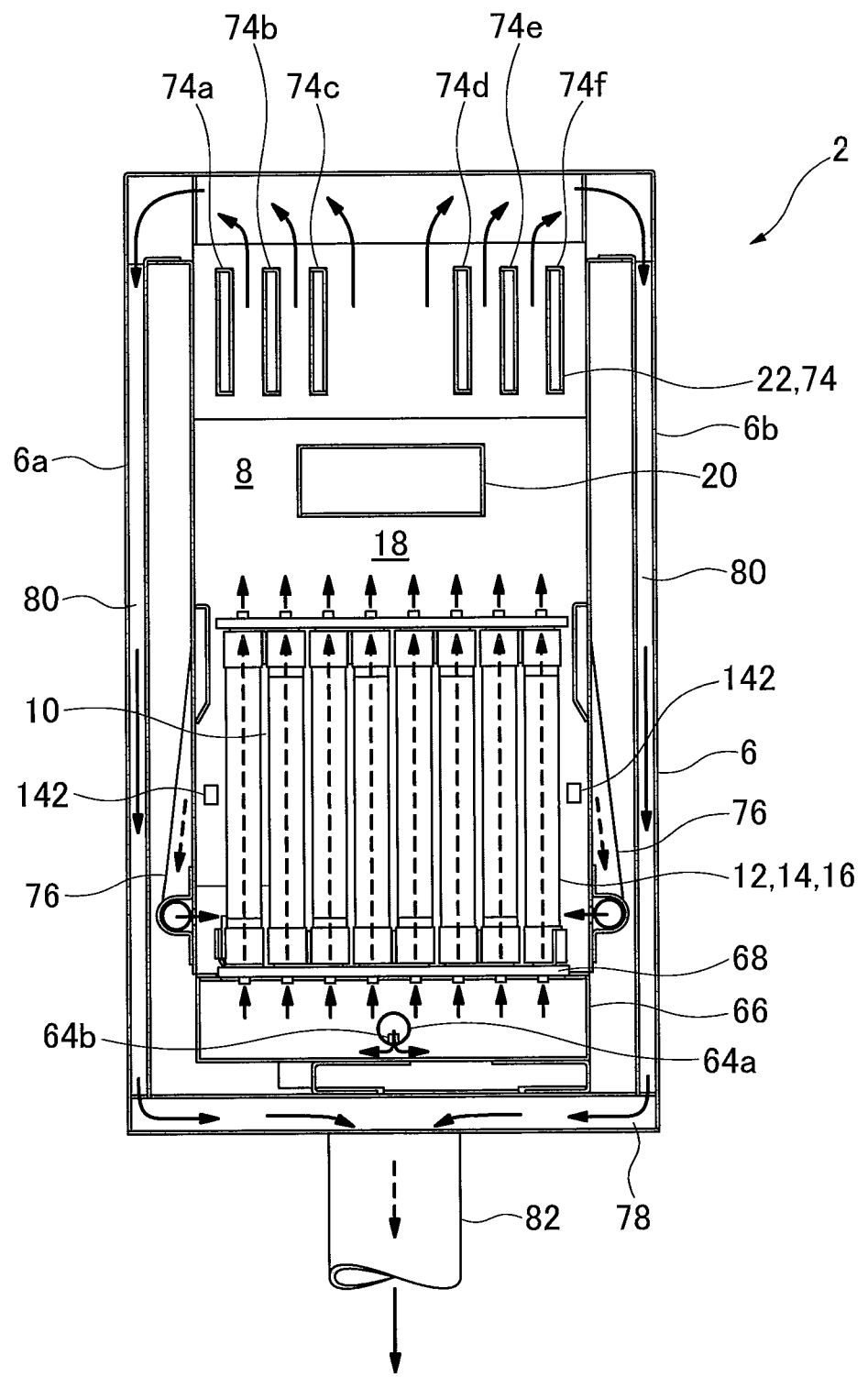
FIG. 6 is a cross section taken along line in FIG. 3.
Figure 7:
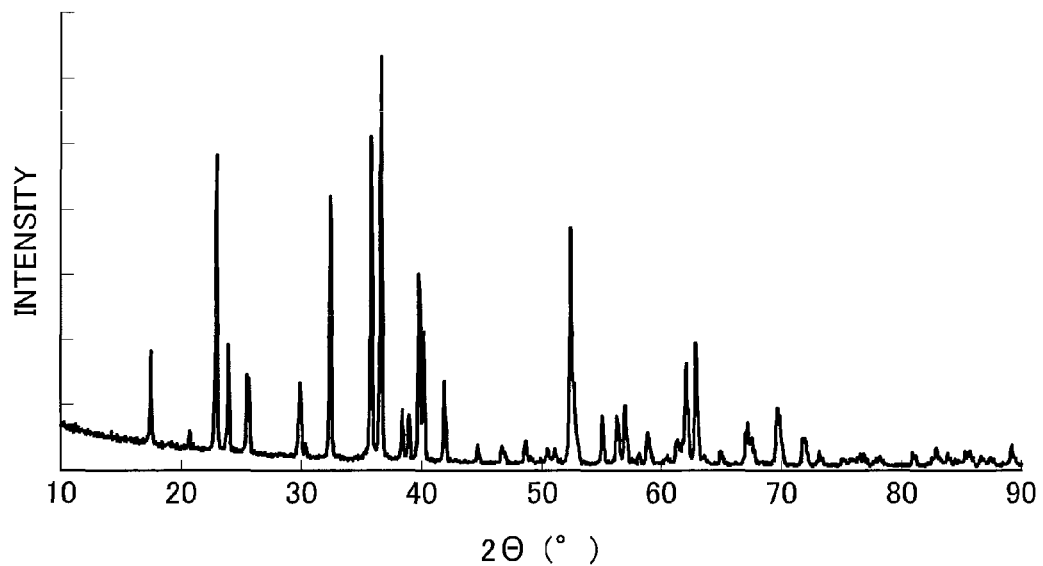
FIG. 7 is an X-ray diffraction pattern of a forsterite powder used in a solid oxide fuel cell of Example 1.
Figure 8:
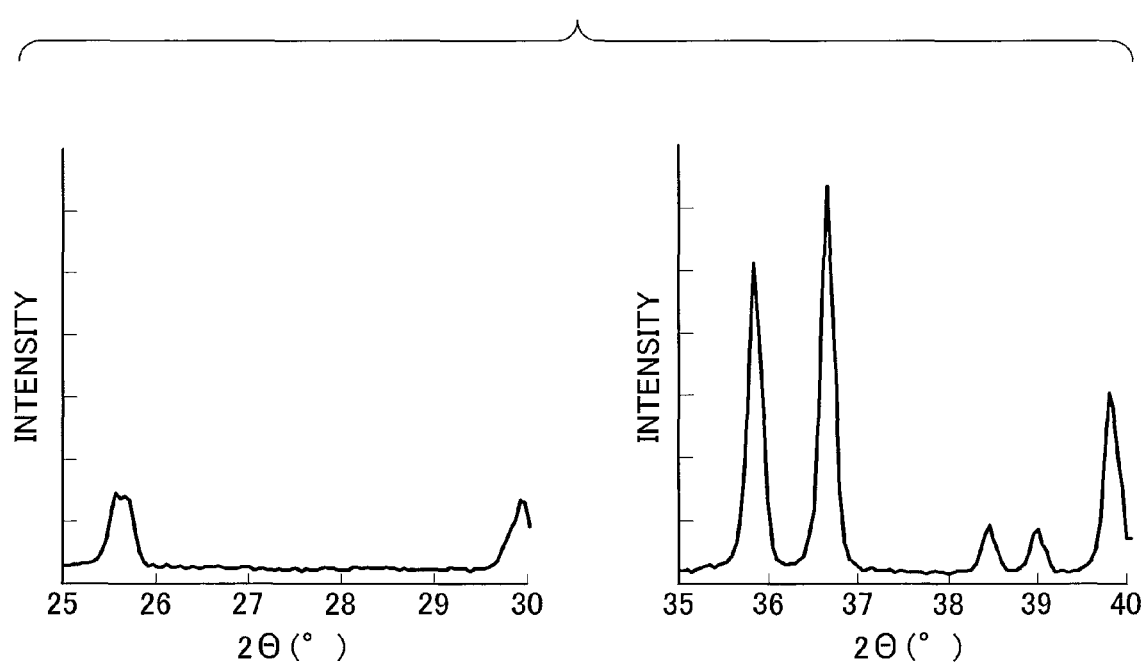
FIG. 8 is a partially enlarged graphs of the X-ray diffraction pattern in FIG. 7 (left: $2\theta=25°$ to $30°$, right: $2\theta=35°$ to $40°$).
Figure 9:
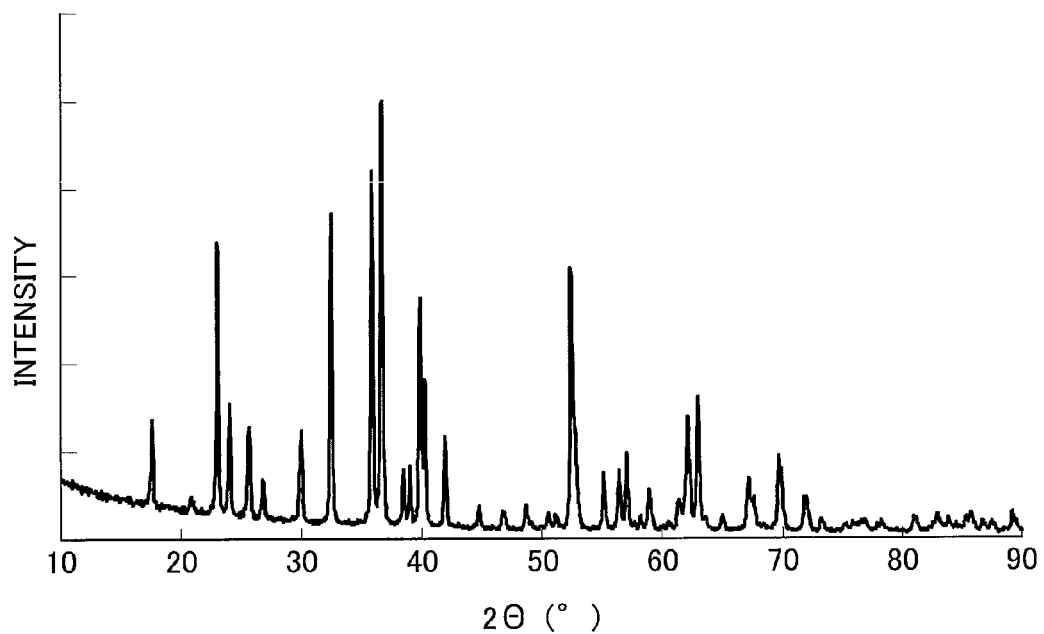
FIG. 9 is an X-ray diffraction pattern of a forsterite powder used in a solid oxide fuel cell of Comparative Example 3.
Figure 10:
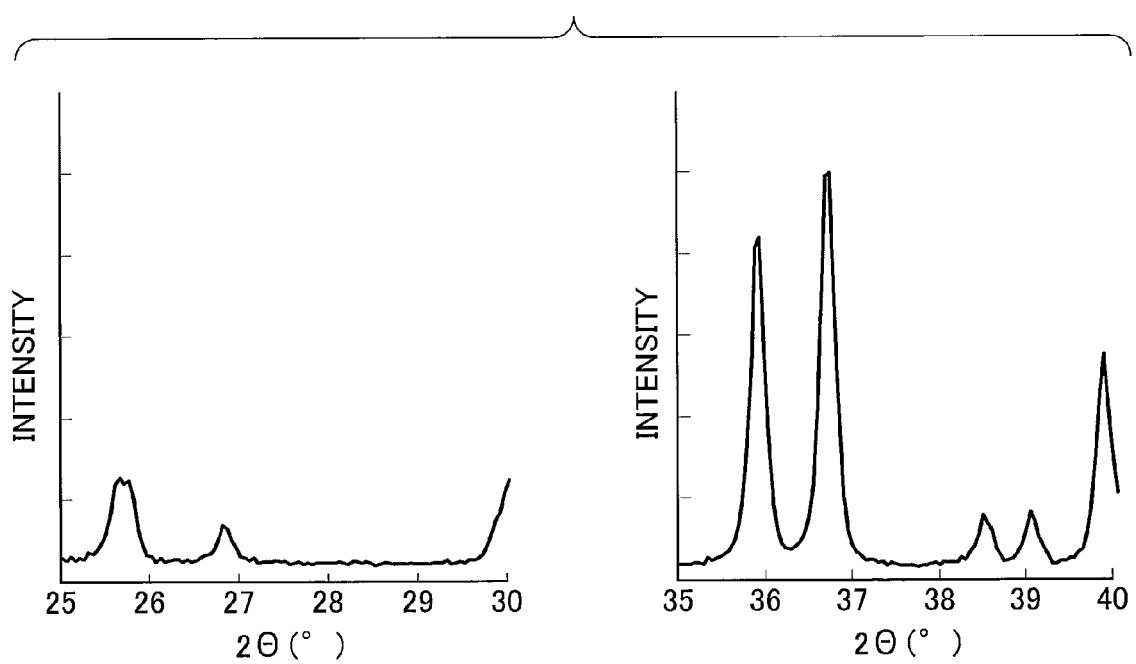
FIG. 10 is a partially enlarged graphs of the X-ray diffraction pattern in FIG. 9 (left: $2\theta=25°$ to $30°$, right: $2\theta=35°$ to $40°$).

Next, with reference to FIGS. 3 and 6, a description will be made of the internal structure of the fuel cell module of the solid oxide fuel cell system. FIG. 3 is a side elevation cross section showing the fuel cell module of the solid oxide fuel cell system. FIG. 6 is a cross section taken along line in FIG. 3. As shown in FIGS. 3 and 6, the fuel cell assembly 12, the reformer 20, and the air heat exchanger 22 are arranged in sequence starting from the bottom in the sealed space 8 within the housing 6 of the fuel cell module 2 as described above.

A pure water guide pipe 60 for introducing pure water and a reformed gas guide pipe 62 for introducing fuel gas to be reformed and reforming air are attached to an upstream end of the reformer 20. Within the reformer 20, a vaporizing section 20*a* and a reforming section 20*b* are formed in sequence starting from the upstream side. The reforming section 20*b* is filled with a reforming catalyst. The fuel gas and air introduced into the reformer 20 and blended with water vapor are reformed by the reforming catalyst filled into the reformer 20.

A fuel gas supply pipe 64 is connected to a downstream end of the reformer 20. The fuel gas supply pipe 64 extends downward and further extends horizontally within a manifold 66 formed under the fuel cell assembly 12. Multiple fuel supply holes 64*b* are formed in a bottom surface of a horizontal portion 64*a* of the fuel gas supply pipe 64. Reformed fuel gas is supplied into the manifold 66 from the fuel supply holes 64*b*.

A lower support plate 68 having through holes for supporting the above-described fuel cell stacks 14 is attached to the top of the manifold 66, and fuel gas in the manifold 66 is supplied into the fuel cell unit 16.

Next, the air heat exchanger 22 is provided over the reformer 20. The air heat exchanger 22 includes an air concentration chamber 70 upstream of the exchanger and two air distribution chambers 72 downstream of the exchanger. The air concentration chamber 70 and the air distribution chambers 72 are connected through six air flow conduits 74. Here, as shown in FIG. 6, air in the air concentration chamber 70 flows from the two sets of the air flow conduits 74, each set has three air flow conduits 74 (74*a*, 74*b*, 74*c*;74*d*,74*e*,74*f*), into the respective air distribution chambers 72.

Air flowing in the six air flow conduits 74 of the air heat exchanger 22 is pre-heated by rising combustion exhaust gas from the combustion chamber 18. An air guide pipe 76 is connected to each of the air distribution chambers 72. The air guide pipe 76 extends downward. The lower end of the air guide pipe 76 communicates with a lower space in the power generating chamber 10 to introduce pre-heated air into the power generating chamber 10.

Next, an exhaust gas chamber 78 is formed below the manifold 66. As shown in FIG. 6, exhaust gas conduits 80 extending in the vertical direction are formed on the insides of a front surface 6*a* and a rear surface 6*b* which form the faces in the longitudinal direction of the housing 6. Top ends of the exhaust gas chamber conduits 80 communicate with a space in which the air heat exchanger 22 is disposed, and bottom ends thereof communicate with the exhaust gas chamber 78. An exhaust gas discharge pipe 82 is connected to nearly a centeral portion of a bottom surface of the exhaust gas chamber 78. A downstream end of the exhaust gas discharge pipe 82 is connected to the aforementioned hot-water producing device 50 shown in FIG. 2. As shown in FIG. 3, an ignition device 83 for starting the combustion of fuel gas and air is provided in the combustion chamber 18.

Figure 4:
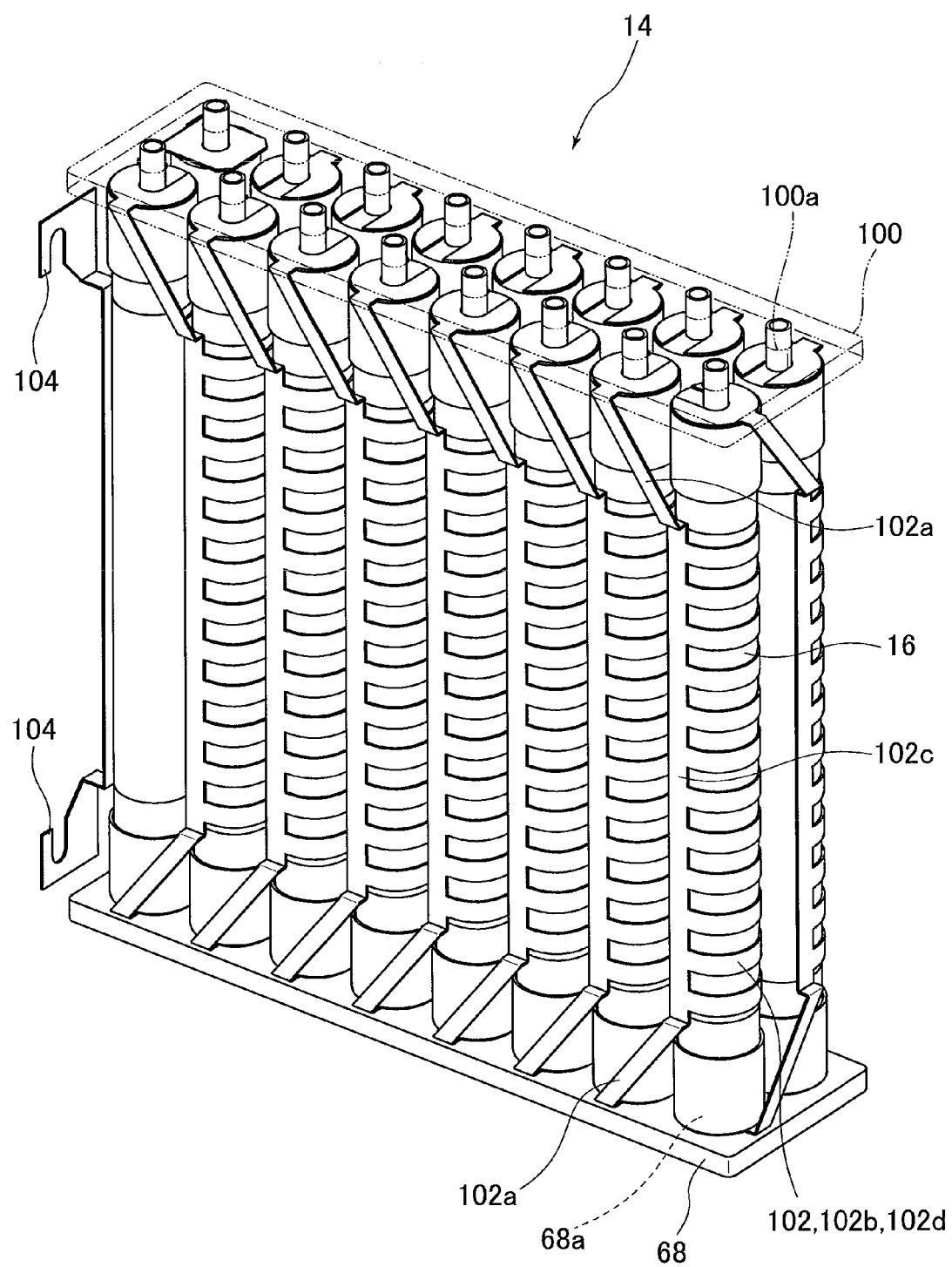
FIG. 4 is a perspective view showing a fuel cell stack in the solid oxide fuel cell system.

Next, referring to FIG. 4, the fuel cell stack 14 will be described. FIG. 4 is a perspective view showing the fuel cell stack in the solid oxide fuel cell system. As shown in FIG. 4, the fuel cell stack 14 is furnished with 16 fuel cell units 16; the top and bottom ends of these fuel cell units 16 are respectively supported by the lower support plate 68 and an upper support plate 100, which are made of ceramic. Through holes 68*a* and 100*a*, through which inner electrode terminals 86 can penetrate, are provided on the lower support plate 68 and the upper support plate 100.

In addition, a current collector 102 and an external terminal 104 are attached to the fuel cell unit 16. The current collector 102 is integrally formed by a fuel electrode connecting portion 102*a*, which is electrically connected to the inner electrode terminal 86 attached to an inner electrode layer 90 serving as the fuel electrode, and by an air electrode connecting portion 102*b*, which is electrically connected to the entire external perimeter of an outer electrode layer 92 serving as the air electrode. The air electrode connecting portion 102*b* is formed of a vertical portion 102*c* extending in the vertical direction along the surface of the outer electrode layer 92, and multiple horizontal portions 102*d* extending in the horizontal direction from the vertical portion 102*c* along the surface of the outer electrode layer 92. The fuel electrode connecting portion 102*a* extends linearly in an upward or downward diagonal direction from the vertical portion 102*c* of the air electrode connecting portion 102*b* toward the inner electrode terminals 86 positioned in the upper and lower directions on the fuel cell unit 16.

Furthermore, the inner electrode terminals 86 at the top and bottom ends of the two fuel cell units 16 positioned at the end of the fuel cell stack 14 (at the front and back sides on the left edge in FIG. 4) are respectively connected to the external terminals 104. These external terminals 104 are connected to the external terminals 104 (not shown) of the fuel cell units 16 at the ends of the adjacent fuel cell stack 14, and as described above, all of the 160 fuel cell units 16 are connected in series.

Figure 5:
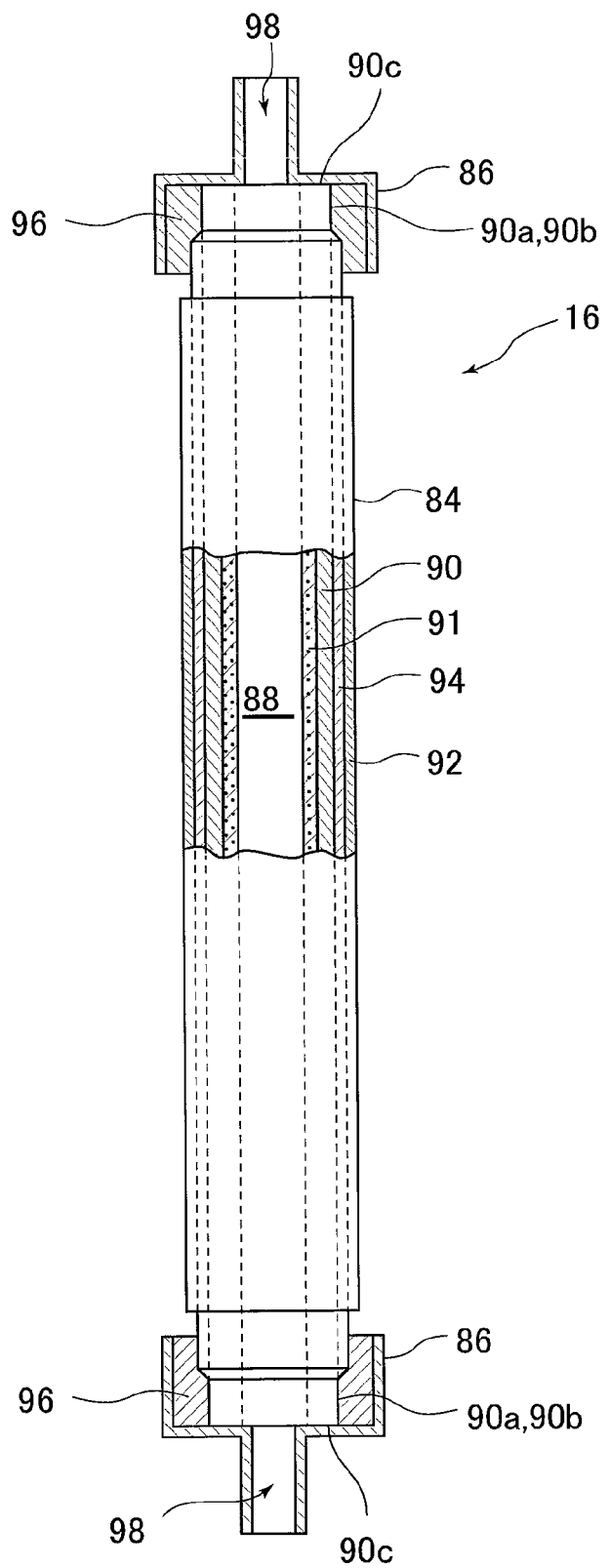
FIG. 5 is a partial cross section showing a fuel cell unit in the solid oxide fuel cell system.

Next, referring to FIG. 5, the fuel cell unit 16 will be described. FIG. 5 is a partial cross section showing the fuel cell unit of the solid oxide fuel cell system. As shown in FIG. 5, the fuel cell unit 16 includes a fuel cell 84 and the inner electrode terminals 86 respectively connected to top and bottom ends of the fuel cell 84. The fuel cell 84 is a tubular structure extending in the vertical direction, and includes the inner electrode layer 90 on a cylindrical porous support 91 defining a fuel gas flow path 88, the outer electrode layer 92, and an electrolyte layer 94 between the inner electrode layer 90 and the outer electrode layer 92.

Since the inner electrode terminals 86 attached to the top and bottom ends of the fuel cell 84 have the same structure, the inner electrode terminal 86 attached to the top end will be specifically described here. A top portion 90a of the inner electrode layer 90 includes an outside perimeter surface 90b and a top end surface 90c which are exposed to the electrolyte layer 94 and the outer electrode layer 92. The inner electrode terminal 86 is connected to the outside perimeter surface 90b of the inner electrode layer 90 through a conductive seal material 96, and connected directly to the top end surface 90c of the inner electrode layer 90 and thereby electrically connected to the inner electrode layer 90. A fuel gas flow path 98 communicating with the fuel gas flow path 88 of the inner electrode layer 90 is formed in a center portion of the inner electrode terminal 86. The fuel cell of the present invention is used as the fuel cell 84.

EXAMPLES

The present invention will be described in more details based on the following Examples. Note that the present invention is not limited to these Examples.

Example 1

Preparation of Green Body A for Porous Support

A forsterite powder (containing 0.02 mass % CaO) having a Mg/Si molar ratio of 1.98 and an A-to-B ratio of 0.0, which was determined by a method described later, was adjusted to have an average particle diameter to 0.7 μm. After 100 parts by weight of the powder was mixed with 20 parts by weight of a solvent (water), 8 parts by weight of a binder (methyl cellulose-based water-soluble polymer), and 15 parts by weight of a pore forming agent (acrylic resin particles having an average particle diameter of 5 μm) using a high-speed mixer, the mixture was kneaded with a kneader and deaerated with a vacuum kneader. Thus, a green body for extrusion was prepared. Here, the average particle diameter was measured according to HS R 1629, and expressed in a 50% diameter (the same applies hereinafter).

(Preparation of Slurry for Fuel Electrode Layer)

A NiO powder and a 10YSZ (10 mol % $Y_2O_3$-90 mol % $ZrO_2$) powder were wet-mixed in a weight ratio of 65:35 to prepare a dry powder. The average particle diameter was adjusted to be 0.7 μm. Then, 40 parts by weight of the powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "10 mol % $Y_2O_3$-90 mol % $ZrO_2$" means that the concentrations of a Y atom and a Zr atom are respectively 10 mol % and 90 mol % based on a total amount of the Y atom and the Zr atom.

(Preparation of Slurry for Fuel Electrode Catalyst Layer)

A mixture of NiO and GDC 10 (10 mol % $Gd_2O_3$-90 mol % $CeO_2$) was prepared by co-precipitation and then heat treated. Thus, a fuel electrode catalyst layer powder was obtained. The mixing ratio of NiO and GDC 10 was 50/50 by weight. The average particle diameter was adjusted to be 0.5 μm. Then, 20 parts by weight of the powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "10 mol % $Gd_2O_3$-90 mol % $CeO_2$" means that the concentrations of a Gd atom and a Ce atom are respectively 10 mol % and 90 mol % based on a total amount of the Gd atom and the Ce atom.

(Preparation of Slurry for Reaction Prevention Layer)

The material used for a reaction prevention layer was 10 parts by weight of a powder of the aforementioned cerium-based oxide (LDC40, that is, 40 mol % $La_2O_3$-60 mol % $CeO_2$). The powder was mixed with 0.04 parts by weight of a $Ga_2O_3$ powder as a sintering additive, 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "40 mol % $La_2O_3$-60 mol % $CeO_2$" means that the concentrations of a La atom and a Ce atom are respectively 40 mol % and 60 mol % based on a total amount of the La atom and the Ce atom.

(Preparation of Slurry A for Solid Electrolyte Layer)

The material used for a solid electrolyte layer was an LSGM powder having a composition of $La_{0.9}Sr_{0.1}Ga_{0.8}Mg_{0.2}O_3$. Then, 40 parts by weight of the LSGM powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry.

(Preparation of Slurry for Air Electrode)

The material used for an air electrode was a powder having a composition of $La_{0.6}Sr_{0.4}Co_{0.2}Fe_{0.8}O_3$. Then, 40 parts by weight of the powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry.

(Preparation of Solid Oxide Fuel Cell)

Using the green body and the slurries obtained as described above, a solid oxide fuel cell was prepared by the following method.

The green body for porous support was extruded to prepare a cylindrical compact. The compact was dried at room temperature, and then heat treated at 1050° C. for 2 hours to prepare a porous support. On the porous support, a fuel electrode layer, a fuel electrode catalyst layer, a reaction prevention layer, and a solid electrolyte layer were formed in that order by slurry coating. This layered assembly was co-fired at 1300° C. for 2 hours. Next, masking was performed on the cell so that the area of an air electrode may be 17.3 $cm^2$, and the air electrode layer was formed on the surface of the solid electrolyte layer and fired at 1100° C. for 2 hours. It should be noted that the porous support had an outside diameter of 10 mm and a wall thickness of 1 mm after co-firing. In the prepared solid oxide fuel cell, the fuel electrode layer had a thickness of 100 μm, the fuel electrode catalyst layer had a thickness of 10 μm, the reaction prevention layer had a thickness of 10 μm, the solid electrolyte layer had a thickness of 30 μm, and the air electrode had a thickness of 20 μm. In addition, the outside diameter of the porous support was measured using a micrometer at a portion where no film was formed. Each thickness was obtained by: cutting the cell after a power generation test on the system, observing the cross section with a SEM at any magnification from 30 to 2000, and then dividing by 2 the sum of the maximum value and the minimum value of the thickness. The cutting point was a central portion of the region where the air electrode was formed.

(Measurement of Peak Ratio by Powder X-Ray Diffraction)
Instrument: X-ray diffractometer "X' Pert PRO" manufactured by PANalytical B.V.
Detector: semiconductor array detector with 100 channels of detecting elements
X-ray output: (Cu sealed tube) tube voltage 40 kV-tube current 40 mA
Characteristic X-ray: Cu-Kα radiation
Filter: Ni
Scanning method: step scanning (scanning step size: 0.05°)
Sample processing: powder pressing With the above-described equipment and conditions, intensities detected at 2θ=10° to 90° were measured. A ratio of a maximum peak height A which appeared at 2θ=26.5° to 27.0° (which is presumably a peak resulting from impurities) to a maximum peak height B which appeared at 2θ=36.5° to 37.0° (which is presumably a peak resulting from the main component), that is, an A-to-B ratio (A/B) as a peak ratio, was expressed by percentage. Note that each peak height is a value obtained by subtracting from the peak intensity the intensity of the background.

(Power Generation Test)

Using the obtained solid oxide fuel cell, power generation test was conducted. Current was collected on the fuel electrode side by pasting and baking a current collecting metal to an exposed portion of the fuel electrode with a silver paste. Current was collected on the air electrode side by applying a silver paste to the surface of the air electrode and then pasting and baking a current collecting metal to an end of the air electrode with the silver paste.

The conditions for power generation were as follows.
Fuel gas: a gas mixture of ($H_2$+3% $H_2O$) and $N_2$ (the mixing ratio was
$H_2:N_2$=7:4 (vol:vol))
Fuel utilization: 75%
Oxidant gas: air
Operation temperature: 700° C.
Current density: 0.2 A/cm$^2$ Under these conditions, the power generation test was conducted. The electromotive force: OCV (V) and the initial potential ($V_0$) after 0 hours of the operation as well as the potential ($V_{5000}$) after 5000 hours of the continuous operation were measured. The durability was expressed by a value obtained by dividing the potential after the 5000-hour continuous operation by the initial potential and multiplying the quotient by 100 ($V_{5000}$*100/$V_0$). Table 1 shows the result.

Examples 2 to 6 and Comparative Examples 1 to 4

A solid oxide fuel cell was prepared in the same manner as in Example 1, except that the forsterite powder (containing 0.02 mass % CaO) used was prepared to have values of a Mg/Si ratio and an A-to-B ratio as shown in Table 1, and the power generation test was conducted. Table 1 shows the result.

TABLE 1

|  | Mg/Si (molar ratio) | Peak Ratio A/B (%) | Electromotive Force (V) | Durability |
|---|---|---|---|---|
| Example 1 | 1.98 | 0.0 | 1.05 | 98.5 |
| Example 2 | 1.98 | 0.8 | 1.03 | 97.0 |
| Example 3 | 1.93 | 6.5 | 1.00 | 93.6 |
| Example 4 | 2.13 | 0.0 | 1.02 | 96.7 |
| Example 5 | 2.10 | 3.7 | 1.02 | 95.1 |
| Example 6 | 2.2 | 0.1 | 1.02 | 95.2 |

TABLE 1-continued

|  | Mg/Si (molar ratio) | Peak Ratio A/B (%) | Electromotive Force (V) | Durability |
|---|---|---|---|---|
| Comparative Example 1 | 1.8 | 15.2 | 0.89 | terminated after 300 h *1 |
| Comparative Example 2 | 2.3 | 9.4 | 0.77 | terminated after 200 h *2 |
| Comparative Example 3 | 1.89 | 9.1 | 0.89 | terminated after 4000 h *3 |
| Comparative Example 4 | 2.08 | 9.3 | 0.77 | immeasurable *4 |

*1: Immediately after the power generation was started, the performance was drastically decreased, and no potential was generated after 300 h, so that the test was terminated. Since the denseness of the electrolyte was significantly poor, a gas leaked out, and the fuel utilization was quite high from the very beginning. Moreover, during the endurance operation, the number of cracks in the electrolyte was increased, and the gas leaked out remarkably. As a result, the fuel utilization was increased, so that the potential was drastically reduced presumably.

*2: Immediately after the power generation was started, the performance was drastically decreased, and no potential was generated after 200 h, so that the test was terminated. Since the denseness of the electrolyte was significantly poor, a gas leaked out, and the fuel utilization was quite high from the very beginning. Moreover, during the endurance operation, the number of cracks in the electrolyte was increased, and the gas leaked out remarkably. As a result, the fuel utilization was increased, so that the potential was drastically reduced presumably.

*3: After 4000 h, the performance was drastically decreased, so that the test was terminated. The denseness of the electrolyte was poor, and a slight amount of a gas leaked out, so that the endurance operation had been performed with a fuel utilization higher than the setting. As a result, the catalytic activity of the fuel electrode was decreased, and the amount of potential generated was reduced presumably.

*4: Immediately after the power generation, the performance was drastically decreased, and the endurance test was impossible. Since the denseness of the electrolyte was significantly poor, a gas as well as current leaked out, and an electrical circuit is formed in the cell. As a result, the fuel was consumed before the power generation was started, and the number of cracks in the electrolyte was increased, so that gas and current leaked out remarkably, and the cell was broken presumably.

Example 7

Preparation of Green Body B for Porous Support

A forsterite powder was prepared to have a Mg/Si molar ratio of 1.98, an A-to-B ratio of 2.6, and 0.5 mass % Ca in terms of CaO concentration, and adjusted to have an average particle diameter of 0.7 μm. After 100 parts by weight of the powder was mixed with 20 parts by weight of a solvent (water), 8 parts by weight of a binder (methyl cellulose), 0.5 parts by weight of a lubricant (fatty acid ester), and 15 parts by weight of a pore forming agent (acrylic resin particles having an average particle diameter of 5 μm) using a high-speed mixer, the mixture was kneaded with a kneader and deaerated with a vacuum kneader. Thus, a green body for extrusion was prepared.

(Preparation of Slurry for Porous Support)

A forsterite powder was prepared to have a Mg/Si molar ratio of 1.98, an A-to-B ratio of 0.0, and 0.02 mass % Ca in terms of CaO concentration, and adjusted to have an average particle diameter of 0.7 μm. Then, 20 parts by weight of the powder, 100 parts by weight of a solvent (ethanol), 2 parts by weight of a binder (ethyl cellulose), and 1 part by weight of a dispersant (nonionic surfactant) were fully stirred with a ball mill to prepare a slurry.

(Preparation of Slurry B for Solid Electrolyte Layer)

The material used for a solid electrolyte layer was a 10YSZ (10 mol % $Y_2O_3$-90 mol % $ZrO_2$) powder. Then, 40 parts by weight of the 10YSZ powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "10 mol % $Y_2O_3$-90 mol % $ZrO_2$" means that the concentrations of a Y atom and a Zr atom are respectively 10 mol % and 90 mol % based on a total amount of the Y atom and the Zr atom.

(Preparation of Slurry for Second Solid Electrolyte Layer)

The material used for a second solid electrolyte layer was the aforementioned GDC 10 (10 mol % $Gd_2O_3$-90 mol %

CeO$_2$) powder. Then, 10 parts by weight of the GDC 10 powder was mixed with 100 parts by weight of a solvent (ethanol), 2 parts by weight of a binder (ethyl cellulose), and 1 part by weight of a dispersant (nonionic surfactant). After that, the resultant mixture was fully stirred to prepare a slurry. Note that "10 mol % Gd$_2$O$_3$-90 mol % CeO$_2$" means that the concentrations of a Gd atom and a Ce atom are respectively 10 mol % and 90 mol % based on a total amount of the Gd atom and the Ce atom.

(Preparation of Solid Oxide Fuel Cell)

Using the green body B for porous support, the slurry for porous support, the slurry for fuel electrode layer, the slurry for fuel electrode catalyst layer, the slurry B for solid electrolyte layer, the slurry for second solid electrolyte layer, and the slurry for air electrode, a solid oxide fuel cell was prepared by the following method.

The green body B for porous support was extruded to prepare a cylindrical compact. The compact was dried at room temperature, and then heat treated at 1050° C. for 2 hours. Next, using the slurry for porous support, a high purity forsterite layer was formed by slurry coating, and heat treated at 1050° C. for 2 hours to prepare a porous support. Further, a fuel electrode layer, a fuel electrode catalyst layer, a solid electrolyte layer, and a second solid electrolyte layer were formed in that order by slurry coating. This layered assembly was co-fired at 1300° C. for 2 hours. Next, masking was performed on the cell so that the area of an air electrode may be 17.3 cm$^2$, and the air electrode layer was formed on the surface of the second solid electrolyte layer and fired at 1100° C. for 2 hours. It should be noted that the porous support had an outside diameter of 10 mm and a wall thickness of 1 mm after co-firing, and the high purity forsterite layer had a thickness of 50 μm. In the prepared solid oxide fuel cell, the fuel electrode layer had a thickness of 100 μm, the fuel electrode catalyst layer had a thickness of 10 μm, the solid electrolyte layer had a thickness of 30 μm, the second solid electrolyte layer had a thickness of 5 μm, and the air electrode had a thickness of 20 μm. In addition, the outside diameter of the porous support was measured using a micrometer at a portion where no film was formed. Each thickness was obtained by: cutting the cell after the power generation test on the system, observing the cross section with a SEM at any magnification from 30 to 2000, and then dividing by 2 the sum of the maximum value and the minimum value of the thickness. The cutting point was a central portion of the region where the air electrode was formed. The power generation test was conducted on the obtained solid oxide fuel cell in the same manner as in Example 1. Table 2 shows the result.

Comparative Example 5

Preparation of Green Body C for Porous Support

A forsterite powder was prepared to have a Mg/Si molar ratio of 1.87, an A-to-B ratio of 0.1, and 2.6 mass % Ca in terms of CaO concentration, and adjusted to have an average particle diameter of 1.3 μm. After 100 parts by weight of the powder was mixed with 20 parts by weight of a solvent (water), 7 parts by weight of a binder (methyl cellulose), 0.4 parts by weight of a lubricant (fatty acid ester), and 10 parts by weight of a pore forming agent (acrylic resin particles having an average particle diameter of 5 μm) using a high-speed mixer, the mixture was kneaded with a kneader and deaerated with a vacuum kneader. Thus, a green body for extrusion was prepared.

(Preparation of Solid Oxide Fuel Cell)

Using the green body C for porous support prepared from the forsterite powder containing 2.6 mass % CaO, the slurry for fuel electrode layer, the slurry for fuel electrode catalyst layer, the slurry B for solid electrolyte layer, the slurry for second solid electrolyte layer, and the slurry for air electrode, a solid oxide fuel cell was prepared by the following method.

The green body C for porous support was extruded to prepare a cylindrical compact. The compact was dried at room temperature, and then heat treated at 1100° C. for 2 hours to prepare a porous support. On the porous support, a fuel electrode layer, a fuel electrode catalyst layer, a solid electrolyte layer, and a second solid electrolyte layer were formed in that order by slurry coating. This layered assembly was co-fired at 1300° C. for 2 hours. Next, masking was performed on the cell so that the area of an air electrode may be 17.3 cm$^2$, and the second air electrode layer was formed on the surface of the solid electrolyte layer and fired at 1100° C. for 2 hours. It should be noted that the porous support had an outside diameter of 10 mm and a wall thickness of 1 mm after co-firing. In the prepared solid oxide fuel cell, the fuel electrode layer had a thickness of 100 the fuel electrode catalyst layer had a thickness of 10 μm, the solid electrolyte layer had a thickness of 30 the second solid electrolyte layer had a thickness of 5 μm, and the air electrode had a thickness of 20 μm. In addition, the outside diameter of the porous support was measured using a micrometer at a portion where no film was formed. Each thickness was obtained by: cutting the cell after a power generation test on the system, observing the cross section with a SEM at any magnification from 30 to 2000, and then dividing by 2 the sum of the maximum value and the minimum value of the thickness. The cutting point was a central portion of the region where the air electrode was formed. The power generation test was conducted on the obtained solid oxide fuel cell in the same manner as in Example 1. Table 2 shows the result.

TABLE 2

| | Mg/Si (molar ratio) | Peak Ratio A/B (%) | State of Solid Electrolyte Layer | Electromotive Force (V) | Durability |
|---|---|---|---|---|---|
| Example 7 | 1.98 | 0.0 | Excellent | 1.10 | 97.0 |
| Comparative Example 5 | 1.87 | 0.1 | Poor | 0.65 | unevaluated |

State of Solid Electrolyte Layer:

The fracture surface of the solid oxide fuel cell was observed using a scanning electron microscope (S-4100 manufactured by Hitachi, Ltd.) at an accelerating voltage of 15 kV with secondary electron images at magnifications from 100 to 10000 to evaluate the shape of the structure of the solid electrolyte layer.

Moreover, after the cut surface of the solid oxide fuel cell was polished, the surface was subjected to elemental analysis using EPMA (Shimadzu electron probe microanalyzer EPMA-8705 manufactured by Shimadzu Corporation), and observed to judge whether or not the structural elements of the solid electrolyte layer were uniformly distributed.

A "Excellent" indicates that the solid electrolyte was made of dense 10YSZ crystals, and apparently no formation of an interlayer was found between the porous support and the fuel electrode.

A "Good" indicates that the solid electrolyte was made of 10YSZ crystals, but an interlayer was observed.

A "Poor" indicates that Ca diffused, so that the 10YSZ crystal phase was not dense.

What is claimed is:

1. A solid oxide fuel cell comprising an inner electrode, a solid electrolyte, an outer electrode, and a porous support, the inner electrode being located between the outer electrode and the porous support, the electrolyte being located between the outer electrode and the inner electrode, wherein
　　the solid electrolyte comprises lanthanum-gallate-based oxide doped with Sr and Mg,
　　the porous support comprises forsterite, and
　　the porous support has a Mg/Si molar ratio of 1.90 to 2.2, and an A-to-B ratio (A/B) of 0.0% to 9.0% wherein A denotes a maximum peak height which appears at a diffraction angle $2\theta=26.5°$ to $27.0°$ and B denotes a maximum peak height which appears at $36.5°$ to $37.0°$ in a powder X-ray diffraction pattern obtained by using Cu-Kα radiation.

2. The solid oxide fuel cell according to claim 1, wherein the solid electrolyte is represented by the general formula $La_{1-a}Sr_aGa_{1-b-c}Mg_bCo_cO_3$, wherein $0.05 \leq a \leq 0.3$, $0 < b < 0.3$, and $0 \leq c \leq 0.15$.

3. The solid oxide fuel cell according to claim 1, wherein the porous support comprises a laminate including at least two layers.

4. The solid oxide fuel cell according to claim 2, wherein the porous support comprises a laminate including at least two layers.

* * * * *